(12) United States Patent
Zhu

(10) Patent No.: US 11,928,982 B2
(45) Date of Patent: Mar. 12, 2024

(54) INTERACTION SYSTEM, METHOD AND DEVICE

(71) Applicant: BOE TECHNOLOGY GROUP CO., LTD., Beijing (CN)

(72) Inventor: Lin Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1393 days.

(21) Appl. No.: 16/324,270

(22) PCT Filed: Feb. 22, 2018

(86) PCT No.: PCT/CN2018/076955
§ 371 (c)(1),
(2) Date: Mar. 20, 2019

(87) PCT Pub. No.: WO2018/201779
PCT Pub. Date: Nov. 8, 2018

(65) Prior Publication Data
US 2023/0186786 A1    Jun. 15, 2023

(30) Foreign Application Priority Data
May 5, 2017    (CN) .......................... 201710312121.3

(51) Int. Cl.
*G09B 21/00*    (2006.01)
*G06F 3/01*    (2006.01)
(Continued)

(52) U.S. Cl.
CPC ............ *G09B 21/009* (2013.01); *G06F 3/015* (2013.01); *G06F 3/16* (2013.01); *H04R 1/403* (2013.01);
(Continued)

(58) Field of Classification Search
CPC ......... G09B 21/009; G06F 3/015; G06F 3/16; H04R 1/403; H04R 1/406; H04R 3/005; H04R 3/12; H04R 2201/401
See application file for complete search history.

(56) References Cited

U.S. PATENT DOCUMENTS 5,840,040 A * 11/1998 Altschuler ............. A61B 5/374
600/545
9,700,261 B2 * 7/2017 Lunner .................. A61B 5/291
(Continued)

FOREIGN PATENT DOCUMENTS

CN    101464729 A    6/2009
CN    104081334 A    10/2014
(Continued)

OTHER PUBLICATIONS

Mirkovic et al., "Target Speaker Detection with Concealed EEG Around the Ear", Jul. 2016, Frontiers in Neuroscience (Year: 2016).*

(Continued)

*Primary Examiner* — Eddy Saint-Vil
(74) *Attorney, Agent, or Firm* — Calfee, Halter & Griswold LLP

(57) ABSTRACT

Embodiments of the disclosure provide an interaction system, method and device. The interaction system includes an electroencephalogram electrode array that determines a position of a sound source and invoking the electroencephalogram electrode corresponding to the position of the sound source to output a touch signal to a user.

16 Claims, 6 Drawing Sheets

(51) Int. Cl.
  *G06F 3/16* (2006.01)
  *H04R 1/40* (2006.01)
  *H04R 3/00* (2006.01)
  *H04R 3/12* (2006.01)

(52) U.S. Cl.
  CPC ............ *H04R 1/406* (2013.01); *H04R 3/005* (2013.01); *H04R 3/12* (2013.01); *H04R 2201/401* (2013.01)

(56) References Cited

U.S. PATENT DOCUMENTS

| | | | |
|---|---|---|---|
| 10,226,624 B2* | 3/2019 | Dietz | H04R 25/606 |
| 2008/0085023 A1* | 4/2008 | Kulkarni | H04R 25/70 381/320 |
| 2013/0035578 A1 | 2/2013 | Chiu et al. | |
| 2014/0337741 A1 | 11/2014 | Reponen et al. | |
| 2014/0342324 A1* | 11/2014 | Ghovanloo | G09B 5/06 434/185 |
| 2014/0369537 A1 | 12/2014 | Pontoppidan et al. | |
| 2017/0180882 A1* | 6/2017 | Lunner | H04R 25/558 |

FOREIGN PATENT DOCUMENTS

| | | | |
|---|---|---|---|
| CN | 104244157 A | 12/2014 | |
| CN | 106354270 A | 1/2017 | |
| CN | 106510702 A | 3/2017 | |
| WO | WO-2017023313 A1 * | 2/2017 | ......... B60R 11/0247 |

OTHER PUBLICATIONS

Haghighi et al., "EEG-assisted Modulation of Sound Sources in the Auditory Scene", Nov. 2016, Computer Science, Biomedical signal processing and control (Year: 2016).*

Kaneko et al., "Light-Emitting Device for Supporting Auditory Awareness of Hearing-Impaired People during Group Conversations", 2013 IEEE International Conference on Systems, Man, and Cybernetics, Manchester, UK, 2013, pp. 3567-3572 (Year: 2013).*

Search Report and Written Opinion for International Patent Application No. PCT/CN2018/076955 dated May 30, 2018.

First Office Action for Chinese Patent Application No. 201710312121.3 dated Feb. 26, 2019.

* cited by examiner

INTERACTION SYSTEM, METHOD AND DEVICE

RELATED APPLICATION

The present application is the U.S. national phase entry of PCT/CN2018/076955, with an international filing date of Feb. 22, 2018, which claims the priority of the Chinese patent application No. 201710312121.3, filed on May 5, 2017, which is entirely incorporated herein by reference.

TECHNICAL FIELD

The present disclosure relates to the field of terminal technology, particularly to an interaction system, method and device.

BACKGROUND

At present, there are many persons with hearing impairments and hearing disabilities, such as deaf persons. The persons with hearing disabilities (hereafter referred as users) generally communicate with other users in a sign language or writing interaction manner.

However, the inventors have found that the sign language or writing interaction manner can be implemented only when the user has perceived that another user is actively requesting an interaction with him. When the user has not perceived that the other user is actively requesting an interaction with him, the sign language or writing communication cannot be done. For example, when the other user actively greets the user to communicate with him, due to hearing disability, the user does not perceive that there is another user who wants to communicate with him, so that a sign language or writing interaction phase will not be entered naturally. This existing interaction method causes users to easily miss many communication opportunities, thus highly reducing a communication probability of the user with other users and having a high impact on the daily life, work and learning of the user.

Another existing interaction method is generally a user perceiving sounds of other users by wearing a hearing aid, so as to communicate with the other users. However, the inventors have found that even if a user with serious hearing disability wears a hearing-aid, he often ignores other users who want to communicate with him by voice (e.g., greetings), thus easily missing many communication opportunities, highly reducing a communication probability of the user with the other users and having a high impact on the daily life, work and learning of the user.

Thus, in existing interaction methods for users with hearing disabilities there is a disadvantage that a user with hearing disability is easy to ignore other users who want to communicate with him by voice, thus missing communication opportunities.

SUMMARY

In order to overcome the disadvantages experienced by users with a hearing disability caused by the user not noticing that other users wish to communicate, the present disclosure provides an interaction system, an interaction method and interaction apparatus. The object of the system, method, and apparatus is to convert a sound made by a sound source (e.g., another user) to a touch signal perceivable by a human brain, so that a user with hearing disability perceives a position of the sound source by means of touch, thus realizing there is another user at the position who wants to communicate with him. This highly improves the probability that the user with hearing disability communicates with other users.

According to the first aspect, an exemplary embodiment of the present disclosure provides an interaction system comprising, an electroencephalogram electrode array comprising at least one electroencephalogram electrode; a micro microphone array comprising at least one micro microphone; a signal processing circuit electrically connected with the electroencephalogram electrode array and the micro microphone array respectively; a memory configured to store data and electrically connected with the signal processing circuit; and at least one program stored in the memory, and configured to carry out, when executed by the signal processing circuit, determining a position of a sound source based on audio signals of the sound source output by the micro microphone array, determining an electroencephalogram electrode of the electroencephalogram electrode array corresponding to the position of the sound source, and invoking the electroencephalogram electrode corresponding to the position of the sound source to output a touch signal.

Further, the signal processing circuit is located above the electroencephalogram electrode array, and the micro microphone array is located above the signal processing circuit.

Further, the micro microphone array comprises a plurality of micro microphones, and the signal processing circuit comprises a processor and a plurality of converting circuits, and the plurality of micro microphones are electrically connected one-to-one with the plurality of converting circuits respectively, and the processor is electrically connected with electroencephalogram electrodes in the electroencephalogram electrode array.

In an exemplary embodiment, the at least one program is further configured to determine a distance between the sound source and each of the micro microphones based on intensities of the audio signals of the sound source output by the plurality of micro microphones; and determine the position of the sound source based on the distance between the sound source and each of the micro microphones.

In some exemplary embodiments, the system further comprises a display apparatus, and the at least one program is further configured to invoke the display apparatus to perform a corresponding display after determining the position of the sound source.

In some exemplary embodiments, the system further comprises a speaker array; speakers in the speaker array are electrically connected with the processor; and the at least one program is further configured to obtain an interaction content electroencephalogram signal of the user and a direction specified by the user through the electroencephalogram electrode array, and invoke at least one speaker corresponding to the direction to output a sound based on the interaction content electroencephalogram signal.

In an exemplary embodiment, the at least one program is configured to invoke the display apparatus to highlight a plurality of direction ranges in a first direction selection interface in turn, when receiving a starting active interaction electroencephalogram signal of the user through the electroencephalogram electrode array; determine a currently highlighted direction range as a direction range specified by the user, when receiving a determination electroencephalogram signal of the user through the electroencephalogram electrode array; invoke the display apparatus to display an interaction information inputting interface; and invoke at least one speaker corresponding to the direction range specified by the user to output a sound based on the interaction content electroencephalogram signal, when receiving the interaction content electroencephalogram signal fed back by the user with respect to guiding of the interaction information inputting interface, through the electroencephalogram electrode array.

In an exemplary embodiment, the at least one program is further configured to, invoke the display apparatus to highlight a plurality of direction ranges in a first direction selection interface in turn, when receiving a starting active interaction electroencephalogram signal of the user through the electroencephalogram electrode array; determine a currently highlighted direction range as a direction range specified by the user, when receiving a determination electroencephalogram signal of the user through the electroencephalogram electrode array; invoke the display apparatus to highlight a plurality of angular directions in a second direction selection interface in turn, after determining the direction range specified by the user; determine a currently highlighted angular direction as an angular direction specified by the user, when receiving a determination electroencephalogram signal of the user through the electroencephalogram electrode array; invoke the display apparatus to display the interaction information inputting interface; and invoke at least one speaker corresponding to the angular direction specified by the user to output a sound based on the interaction content electroencephalogram signal, when receiving the interaction content electroencephalogram signal fed back by the user with respect to guiding of the interaction information inputting interface, through the electroencephalogram electrode array.

According to the second aspect, an exemplary embodiment of the present disclosure provides an interaction method comprising, determining a position of a sound source based on audio signals of the sound source output by a micro microphone array; determining an electroencephalogram electrode of an electroencephalogram electrode array corresponding to the position of the sound source; and invoking the electroencephalogram electrode corresponding to the position of the sound source to output a touch signal.

In some exemplary embodiments, the method further comprises, determining a distance between the sound source and each of a plurality of micro microphones of the micro microphone array based on intensities of audio signals of the sound source output by the micro microphones; and determining the position of the sound source based on the distance between the sound source and each of the micro microphones.

Such exemplary embodiments of the method further comprise, invoking a display apparatus to correspondingly display the determined position of the sound source.

Some exemplary embodiments of the invention comprise, obtaining an interaction content electroencephalogram signal of the user and a direction specified by the user through the electroencephalogram electrode array; and invoking at least one speaker of a speaker array corresponding to the direction to output a sound based on the interaction content electroencephalogram signal.

In an exemplary embodiment, the method comprises invoking the display apparatus to highlight a plurality of direction ranges in a first direction selection interface in turn, when receiving a starting active interaction electroencephalogram signal of the user through the electroencephalogram electrode array; determining a currently highlighted direction range as a direction range specified by the user, when receiving a determination electroencephalogram signal of the user through the electroencephalogram electrode array; invoking the display apparatus to display an interaction information inputting interface; and invoking at least one speaker corresponding to the direction range specified by the user to output a sound based on the interaction content electroencephalogram signal, when receiving the interaction content electroencephalogram signal fed back by the user with respect to guiding of the interaction information inputting interface, through the electroencephalogram electrode array.

In another exemplary embodiment, the method comprises invoking the display apparatus to highlight a plurality of direction ranges in a first direction selection interface in turn, when receiving a starting active interaction electroencephalogram signal of the user through the electroencephalogram electrode array; determining a currently highlighted direction range as a direction range specified by the user, when receiving a determination electroencephalogram signal of the user through the electroencephalogram electrode array; invoking the display apparatus to highlight a plurality of angular directions in a second direction selection interface in turn; determining a currently highlighted angular direction as an angular direction specified by the user, when receiving a determination electroencephalogram signal of the user through the electroencephalogram electrode array; invoking the display apparatus to display the interaction information inputting interface; and invoking at least one speaker corresponding to the angular direction specified by the user to output a sound based on the interaction content electroencephalogram signal, when receiving the interaction content electroencephalogram signal fed back by the user with respect to guiding of the interaction information inputting interface, through the electroencephalogram electrode array.

According to the second aspect, an exemplary embodiment of the present disclosure provides an interaction device comprising, a sound source position determining component for determining a position of a sound source based on audio signals of the sound source output by a micro microphone array; an electroencephalogram electrode determining component for determining an electroencephalogram electrode of an electroencephalogram electrode array corresponding to the position of the sound source; and a signal outputting component for invoking the electroencephalogram electrode corresponding to the position of the sound source to output a touch signal.

Further, in such embodiments, the sound source position determining component is specifically used for, determining a distance between the sound source and each of a plurality of micro microphones of the micro microphone array based on intensities of audio signals of the sound source output by the micro microphones; and determining the position of the sound source based on the distance between the sound source and each of the micro microphones.

In exemplary embodiments the signal outputting component is further used for invoking a display apparatus to correspondingly display the position of the sound source determined by the sound source position determining component.

In such exemplary embodiments the interaction device further comprises a sound outputting component for obtaining an interaction content electroencephalogram signal of the user and a direction specified by the user through the electroencephalogram electrode array; and invoking at least one speaker of a speaker array corresponding to the direction to output a sound based on the interaction content electroencephalogram signal.

In an exemplary embodiment, the method comprises the sound outputting component is specifically used for, invoking the display apparatus to highlight a plurality of direction ranges in a first direction selection interface in turn, when receiving a starting active interaction electroencephalogram signal of the user through the electroencephalogram electrode array; determining a currently highlighted direction range as a direction range specified by the user, when receiving a determination electroencephalogram signal of the user through the electroencephalogram electrode array; invoking the display apparatus to display an interaction information inputting interface; and invoking at least one speaker corresponding to the direction range specified by the user to output a sound based on the interaction content electroencephalogram signal, when receiving the interaction content electroencephalogram signal fed back by the user with respect to guiding of the interaction information inputting interface, through the electroencephalogram electrode array.

In an exemplary embodiment, the method comprises the sound outputting component is specifically used for, invoking the display apparatus to highlight a plurality of direction ranges in a first direction selection interface in turn, when receiving a starting active interaction electroencephalogram signal of the user through the electroencephalogram electrode array; determining a currently highlighted direction range as a direction range specified by the user, when receiving a determination electroencephalogram signal of the user through the electroencephalogram electrode array; invoking the display apparatus to highlight a plurality of angular directions in a second direction selection interface in turn; determining a currently highlighted angular direction as a angular direction specified by the user, when receiving a determination electroencephalogram signal of the user through the electroencephalogram electrode array; invoking the display apparatus to display the interaction information inputting interface; and invoking at least one speaker corresponding to the angular direction specified by the user to output a sound based on the interaction content electroencephalogram signal, when receiving the interaction content electroencephalogram signal fed back by the user with respect guiding of the interaction information inputting interface, through the electroencephalogram electrode array.

The additional aspects and advantages of the present disclosure will be partly given in the following description and become apparent in the following description or be known by practice of the present disclosure.

BRIEF DESCRIPTION OF THE DRAWINGS

The above and/or additional aspects and advantages of the present disclosure will become apparent and be easily understood by the following description of the embodiments in combination with the drawings, in which.

DETAILED DESCRIPTION

Figure 1:
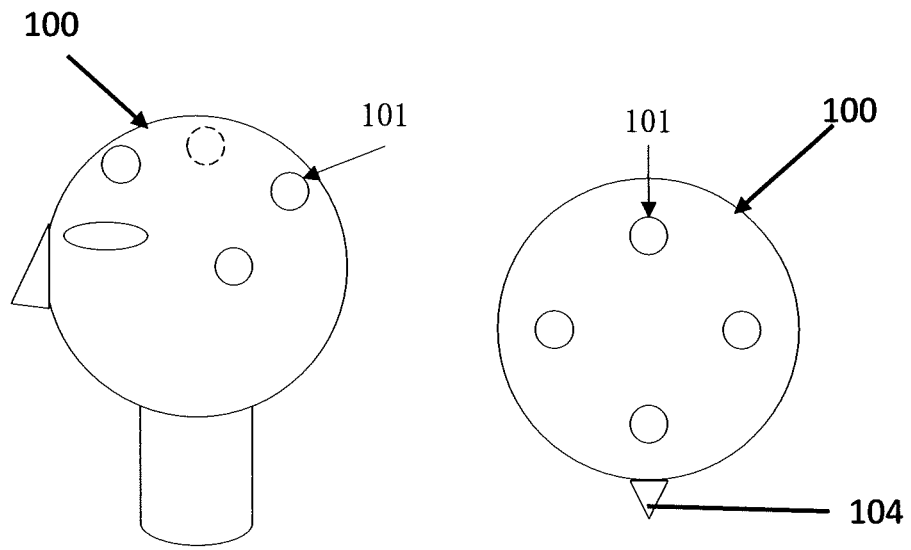
FIG. 1 is a schematic diagram of a head of a user wearing an interaction system of an embodiment of the present disclosure.

Exemplary embodiments of the present disclosure will be described below in detail. Examples of the embodiments are shown in the drawings in which the same or similar reference signs represent the same or similar elements or elements having the same or similar functions throughout. The embodiments described below with reference to the drawings are illustrative, and are used only for explaining the present disclosure, rather than being construed as a limitation to the present disclosure.

The inventors have realized that, a plurality of microphones, such as capacitive microphones also referred as capacitive mikes, can be used for collecting a sound made by a sound source, and a position of the sound source is determined by subsequent processing, and this information is provided to a user with hearing disability.

However, the inventors have found that, there are many technical problems to collect the sound made by the sound source directly with the plurality of microphones (capacitive mikes). For example, it is difficult for a user to carry around a traditional capacitive mike because of their weight and volume. For example, a capacitive mike has a capacitive output impedance and a low capacitance, but has a very high capacitive impedance in the case of lower frequencies. In order to ensure sensitivity of the capacitive mike in case of lower frequencies, there should be an impedance converter having an input impedance larger than or equal to its output impedance to connect with it, and after impedance converting, connection to an amplifier using a transmission line. The capacitive mike needs to use a power source. The presense of such a power source causes the whole device and apparatus to have a higher weight and volume, thus leading to inconvenient use.

Exemplary embodiments of the technical solutions of the present disclosure will be introduced below in combination with the drawings. Users applicable to the technical solutions of the present disclosure comprise users with hearing disabilities. Hearing disabilities can be inborn or acquired. Users with hearing disabilities can comprise users who cannot hear a sound below a specified sound level (e.g. users who cannot hear a sound below 100 decibels) and users who completely lose hearing (commonly known as the deaf). Further, users with hearing disability can also comprise users with hearing and language disabilities, such as deaf-mutes.

A specific exemplary embodiment of the interaction system provided by the present disclosure comprises a head-mounted interaction system.

The head-mounted interaction system comprises an electroencephalogram electrode array, a signal processing circuit, a micro microphone array and a memory. For example, the left portion of FIG. 1 is a schematic left-side view of a head of a user wearing the head-mounted interaction system of an embodiment of the present disclosure. At the left part of FIG. 1, a big circle 100 similar to a perfect circle represents the head of the user, a cylindrical surface below the big circle represents a neck of the user, a triangle on the left of the big circle represents a nose of the user, a small ellipse corresponding to the triangle within the big circle represents a left eye of the user, and small circles on the top of the big circle represent electroencephalogram electrodes 101 in the electroencephalogram electrode array of the embodiment of the present disclosure. The right part of FIG. 1 is a schematic top view of the head 102 of the user wearing the head-mounted interaction system of an embodiment of the present disclosure. At the right part of FIG. 1, a big circle 100 represents the head of the user, a triangle 104 below the big circle represents the nose of the user, and small circles within the big circle represent electroencephalogram electrodes 101 in the electroencephalogram electrode array.

The electroencephalogram electrode array covers a surface of the head of the user. In an exemplary embodiment, the electroencephalogram electrode array directly contact with the skin of the head of the user.

The signal processing circuit is electrically connected with the electroencephalogram electrode array and the micro microphone array respectively.

In an exemplary embodiment, the signal processing circuit is above the electroencephalogram electrode array, and is electrically connected with the electroencephalogram electrode array. The memory is electrically connected with the signal processing circuit. The micro microphone array covers the signal processing circuit, and is electrically connected with the signal processing circuit.

It can be understood that, the signal processing circuit is located between the electroencephalogram electrode array and the micro microphone array, which is equivalent to generally making the electroencephalogram electrode array to be isolated with the micro microphone array (in space), thus benefiting to reduce interference between the electroencephalogram electrode array and the micro microphone array. The electroencephalogram electrode array is located below the signal processing circuit and at a side of the signal processing circuit close to the user, thus obtaining electroencephalogram signals of the user from the bottom. The micro microphone array is located above the signal processing circuit and at a side of the signal processing circuit away from the user, thus obtaining sounds made by various sound sources around the head of the user. Also, these reduce mutual interference between the micro microphone array and the electroencephalogram electrode array at work. In order to meet the preferences of different client users, the quantity of the micro microphones mentioned in the embodiment is independent from different head-mounted interaction systems without a fixed limitation. Depending on different user requirements, different quantities of micro microphones can be flexibly selected and form a micro microphone array in various arrangements to cover the surface of the head of the user.

Further, the "above" and the "below" herein only refer to arrangement of the electroencephalogram electrode array, the signal processing circuit and the micro microphone array of certain exemplary embodiments. In other exemplary embodiments, all of the electroencephalogram electrode array, the signal processing circuit and the micro microphone array are carried on a substrate of the head-mounted interaction system. An exemplary embodiment may be an integrated apparatus. In exemplary embodiments, the substrate of the head-mounted interaction system can be set as a shape, such as, without limitation, a hairpin-like shape, a hair-clasp-like shape, a cap-like shape, or a helmet-like shape, suitable for user head wearing depending on actual requirements. When wore, a part close to the head is described as the "bottom", and a part away from the head is described as the "top".

In an exemplary embodiment, the micro microphone array comprises a plurality of micro microphones. Specifically, the micro microphones can be Micro Electro Mechanical System (MEMS) microphones. It can be determined by the skilled in the art depending on experimental data, experience data, historical data, and/or actual situations that the quantity and arrangement of the micro microphones in the micro microphone array.

The MEMS is also known as a Micro Electro Mechanical System, a micro system, a micro Machinery, etc., has developed based on the micro electro technology (semiconductor manufacture technology), and is a high technology electro mechanical device manufactured in combination with technologies such as lithography, etching, thin film, LIGA (the word of LIGA stems from the abbreviation of three German words Lithographie, Galvanoformung and Abformung, and LI refers to deep X-ray Lithography, G refers to electroforming, and A refers to plastic moulding), silicon-micromachining, non-silicon-micromachining and precision machining.

In certain exemplary embodiment, the signal processing circuit comprises a processor and a plurality of converting circuits. In exemplary embodiments, the processor can be specifically a central processing unit (CPU), a microprogrammed control unit (MCU), or a Field-Programmable Gate Array (FPGA), etc.

The electroencephalogram electrode array comprises a plurality of the electroencephalogram electrodes. The quantity and arrangement of the electroencephalogram electrodes in the electroencephalogram electrode array can be determined by the skilled in the art depending on experimental data, experience data, historical data, and/or actual situations.

Figure 2:
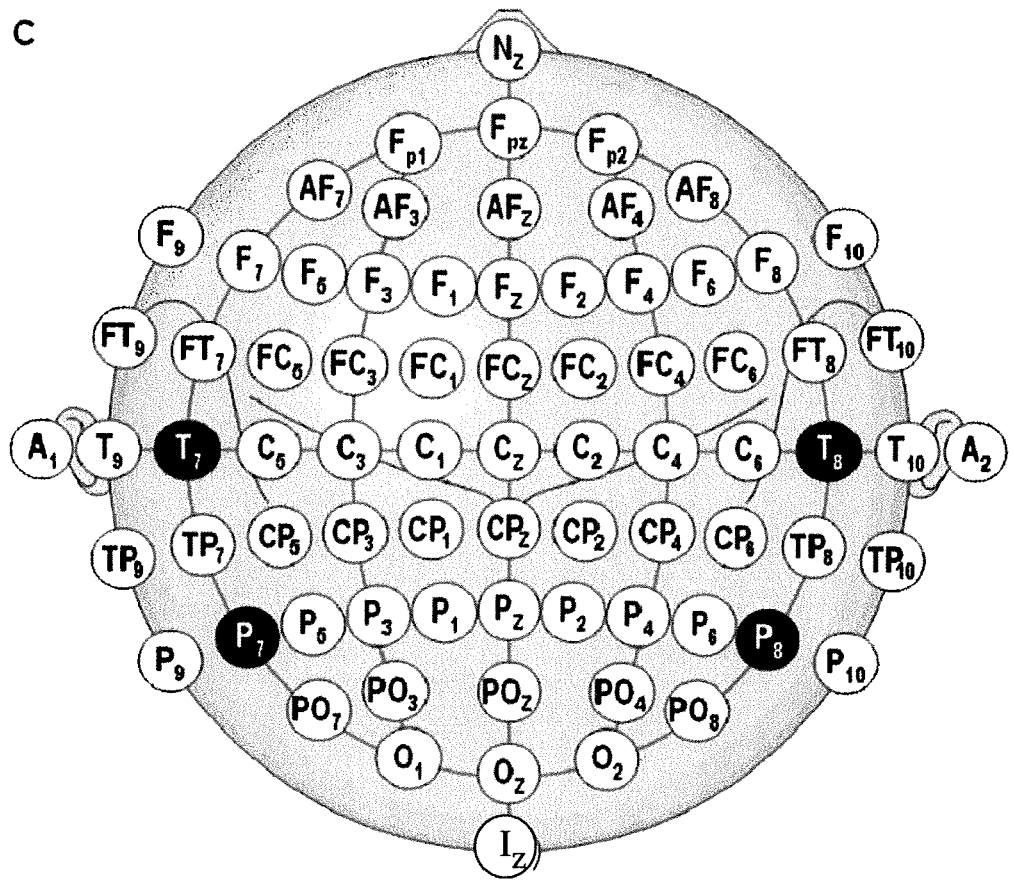
FIG. 2 is a schematic diagram of an example of an electroencephalogram electrode array of an embodiment of the present disclosure.

For example, FIG. 2 shows an example of an electroencephalogram electrode array of an embodiment of the present disclosure. It can be seen in the illustrated exemplary embodiment that a plurality of corresponding parts of the human head correspond to the arrangement of a plurality of electroencephalogram electrodes in the electroencephalogram electrode array of FIG. 2, so as to precisely locate positions of sound sources and connect electroencephalogram signals later. Small circles of FIG. 2 comprising characters of N, FC, C, CP, O, A, T, TP, AF, F, P, PO, etc. represent (standard) electroencephalogram electrodes. In order to distinguish relationships between the electroencephalogram electrodes and the two brain hemispheres, generally, electroencephalogram electrodes arranged at the right part of the head of the user for connecting the electroencephalogram signals of the right brain hemisphere of the user are labeled with even numbers, electroencephalogram electrodes arranged at the left part of the head of the user for connecting the electroencephalogram signals of the left brain hemisphere of the user are labeled with odd numbers, and electroencephalogram electrodes arranged at the center of the head of the user are labeled with a subscript Z. A central sagittal line, e.g. a line of FIG. 2 from $N_z$, to $F_z$, to $C_z$, and to $L_z$, is formed from the nose to the occipital protuberance, and two lines (also called left and right pupil occipital lines) equally parallel to the central sagittal line, e.g. a line of FIG. 2 from $F_{P1}$, to $C_3$, and to $O_1$, and a line of FIG. 2 from $F_{P2}$, to $C_4$, and to $O_2$, are formed from the center of the two pupils looking straight ahead, upward and backward to the occipital protuberance. The quantity and arrangement of the electroencephalogram electrodes are only a exemplary embodiment of many quantities and arrangements usable in the present disclosure, and can also be flexibly adjusted depending on different requirements of different users.

In an exemplary embodiment, Micro microphones in the micro microphone array are electrically connected with converting circuits in the signal processing circuit respectively, and the converting circuits are electrically connected with the processor. The processor is electrically connected with the electroencephalogram electrodes in the electroencephalogram electrode array. The Processor is electrically connected with the memory. Physically, the processor and the memory can be integrated together, e.g. integrated in a same chip. The processor can be one or more processors, and the memory can be one or more memories.

Figure 3:
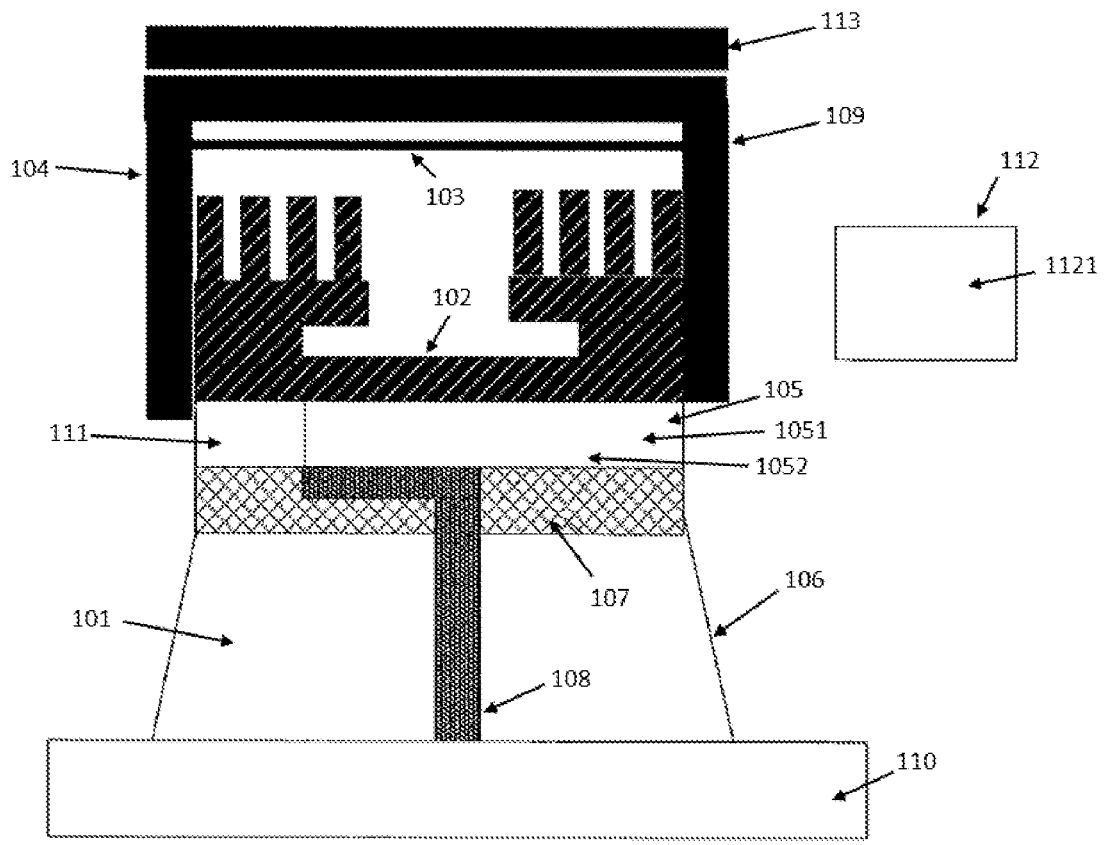
FIG. 3 is a schematic structure diagram of an example of an interaction system of an embodiment of the present disclosure.

In an exemplary embodiment, an example of an interaction system of an embodiment of the present disclosure is introduced below. FIG. 3 is a schematic structure diagram of an example of a head-mounted interaction system of an embodiment of the present disclosure. For convenient understanding, as briefly shown in FIG. 3, the micro microphone array 304 is shown as one MEMS microphone, and the electroencephalogram electrode array 301 is shown as one electroencephalogram electrode. The electroencephalogram electrode array 301 directly contacting with the skin of the head of the user is at the bottom level of the head-mounted interaction system, and the electroencephalogram electrode array 301 is located at the bottom of the head-mounted interaction system and covers a surface of the head of the user, thus benefiting to obtain electroencephalogram signals of the user from the bottom. The signal processing circuit 305 is electrically connected with the micro microphone array 304 located on the top of the head-mounted interaction system and the electroencephalogram electrode array respectively. The micro microphone array 304 covers the signal processing circuit 305 and is located on the top of the head-mounted interaction system, thus benefiting to obtain sounds from the top and the horizontal. The signal processing circuit 305 comprises a processor 1051 and a plurality of converting circuits 1052. In order to obtain audio more precisely and effectively, each converting circuit can correspond to one micro microphone one-to-one.

Only one processor is configured, thus benefiting to simplify the interaction system circuit and reduce cost of the system apparatuses. The signal processing circuit 305 is also electrically connected with the memory 311. The memory stores at least one program configured to, when executed by the signal processing circuit 305, implement the methods of the embodiments of the present disclosure.

In FIG. 3, the bottom surface of the electroencephalogram electrode directly contacts with the skin 310 of the head of the user. An insulation structure covers the top surface of the electroencephalogram electrode, and the signal processing circuit 305 is arranged at the top surface of the insulation structure 307. MEMS microphone array 304 is arranged above the signal processing circuit 305. The "Inverted L" type electrode 308 functions as a connecting wire for electrically connecting input and output pins of the processor 1051 of the signal processor circuit 305 with the electroencephalogram electrode of the electroencephalogram electrode array 301. It is understood that, types of processors such as MCU are various, and quantities and arrangements of input and output pins thereof are also various. Therefore, the "Inverted L" type is only a section illustration of a special example of a connecting wire or a part thereof. Other types of connections between input and output pins of the processor and the connecting wire can be selected. The types comprise, but are not limited to, the "Inverted L" type.

In an exemplary embodiment a MEMS microphone (belonging to a micro microphone) comprises a protection cover 309 located in the outmost layer, a vibrating diaphragm 303 located in the empty internal cavity, and a fixed electrode 302 located at the bottom. The fixed electrode 302 is electrically connected with the signal processing circuit 305. Further, the electroencephalogram electrode is also provided with a protection shell 306 for resisting external interference (e.g. resisting external mechanical forces or chemical corrosion, or interference of external electrical signals), thus protecting the electroencephalogram electrode.

Further, the micro microphone array comprises a plurality of micro microphones. A position of one sound source is determined based on intensities of audio signals connected by using the plurality of micro microphones from the same sound source.

Exemplarily, the head-mounted interaction system of the embodiment of the present disclosure further comprises a display apparatus 312. In terms of structure, the display apparatus 312 can be integrated in a body of the head-mounted interaction system, or can be arranged in the surrounding environment and electrically connected with the body of the head-mounted interaction system. In terms of connecting manner, the display apparatus 112 can be electrically connected with the signal processing circuit 105 in a wired or wireless mode.

In an exemplary embodiment, the display apparatus 312 comprises a display screen 1121 for inputting and/or displaying a direction specified by a user (and used for active interaction).

In an exemplary embodiment, the physical forms of the display screen 1121 are various, and he display screen 1121 for example can be a plate display screen, or Virtual Reality (VR) glasses developed based on the virtual reality technology that meets an urgent requirement of a user with hearing disability to respond and communicate toward the position of the sound source and further supports a requirement of the user to actively initiate a communication, or a large screen which can be connected wirelessly and remotely and viewed simultaneously by multiple persons. The virtual reality technology is a computer simulation system which can create and experience the virtual world. It generates an analogous environment with a computer, and is a system simulation having a multi-source information fusion and interactive three-dimensional dynamic scene and entity behavior, to make the user be immersed in the environment.

Exemplarily, the head-mounted interaction system of the embodiment of the present disclosure further comprises a speaker array 313.

At least one speaker in the speaker array 313 is electrically connected with the processor in the signal processing circuit. After at least one program in the processor of the signal processing circuit obtains an interaction content electroencephalogram signal of the user and a direction specified by the user through the electroencephalogram electrode array, at least one corresponding speaker is invoked to output a sound based on the interaction content electroencephalogram signal, such as a voice, i.e., the speaker array 313 makes a voice toward the position of the sound source.

The quantity and arrangement of the speakers can also be various. One, two or more speakers can be disposed depending on different user requirements. If one speaker is disposed, the speaker can be selectively disposed right above the head. If two speakers are disposed, the speakers can be selectively arranged in the left and right brain hemisphere regions respectively. If more than two speakers, e.g. four speakers, are disposed, the speakers can be selectively arranged in the eastern, western, southern and northern head regions respectively.

Of course, exemplary embodiments of the interaction system of the present disclosure are not limited to the above head-mounted interaction system, and can comprise any other suitable implementations.

Figure 4A:
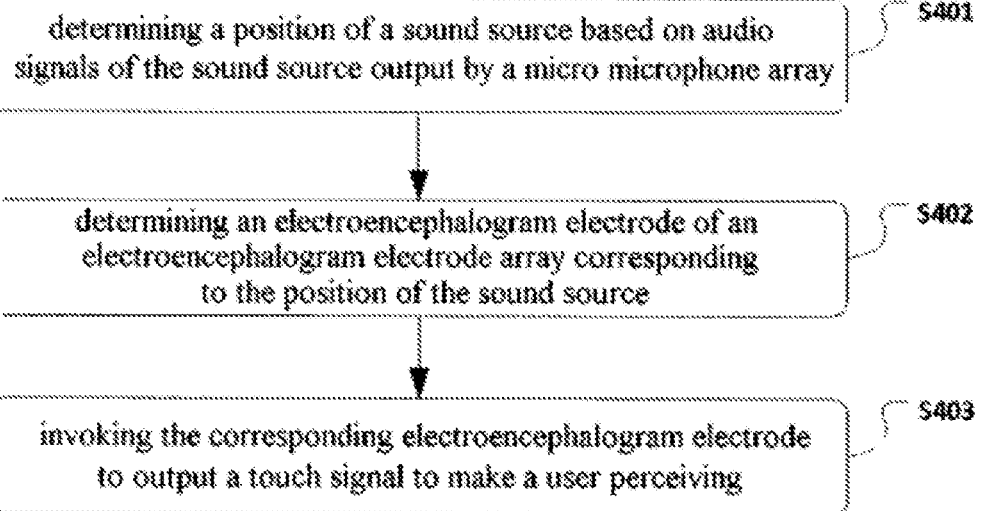
FIG. 4*a* is a schematic flow chart of an interaction method provided by an embodiment of the present disclosure.

Matched with the interaction system provided by the above embodiments, the present disclosure also provides an interaction method. FIG. 4a shows a schematic flow chart of the method which comprises the steps of, S401, determining a position of a sound source based on audio signals of the sound source output by a micro microphone array; S402, determining an electroencephalogram electrode of an electroencephalogram electrode array corresponding to the position of the sound source; and S403, invoking the electroencephalogram electrode corresponding to the position of the sound source to output a touch signal to make a user perceiving.

In the step of S401, the determining the position of the sound source based on the audio signals of the sound source output by the micro microphone array further comprises, determining a distance between the sound source and each of a plurality of micro microphones based on intensities of the audio signals of the sound source output by the plurality of micro microphones; and determining the position of the sound source based on the distance between the sound source and each of the micro microphones.

The process of determining the position of the sound source based on the intensities of the audio signals connected from the same sound source using the plurality of the micro microphones, can determine the distance between each of the micro microphones and the sound source using the intensities of the audio signals of the sound source, so as to determine the position of the sound source, without connecting or determining a direction of an audio signal of each micro microphone.

The inventors has found by study that, an audio made by a sound source changes with a transmission distance of the audio. The audio intensity is inversely proportional to the transmission distance without an external amplifier. Audio signals connected by the plurality of micro microphones at different positions above the head for a same sound source at the same time have different intensities. A strong signal represents a short distance between the sound source and the micro microphone corresponding to the strong signal, and a weak signal represents a long distance between the sound source and the micro microphone corresponding to the weak signal. Therefore, based on the discovery, in the embodiments of the present disclosure, the distance between the sound source and each of the micro microphones can be determined based on the intensities of the audio signals of the sound source output by the plurality of the micro microphones.

It can be easily seen that, a determined distance between a micro microphone and a sound source is proportional to an intensity of a sound of the sound source received by the micro microphone. The stronger the intensity of the received sound is, the stronger the intensity of the converted audio signal is and the shorter the distance between the determined micro microphone and the sound source is, and vice versa.

The distance between the micro microphone and the sound source is a scalar without a direction. Therefore, the process of processing the distance between the sound source and each of the micro microphones to determine the position of the sound source is a process of processing a scalar.

Compared with the traditional process processing a vector having a direction, it highly reduces the amount of calculation and improve the speed and efficiency of determining the position of the sound source, thus benefiting to enhance the instantaneity of subsequent touch signals outputting of the interaction system.

The principle and the method of determining the position of the sound source based on the distance between the sound source and each of the micro microphones will be introduced below in detail.

Exemplarily, a principle and a method of determining the position of the sound source based on the distance between the sound source and each of the micro microphones comprises the following steps.

A plurality of candidate positions of the sound source are determined based on a distance between a first micro microphone and the sound source and a distance between a second micro microphone and the sound source. If taking a line segment between the two micro microphones as an axis and rotating a line segment between the sound source and one of the two micro microphones around the axis, a circle formed by the sound source constitutes the candidate positions.

Two mirrored candidate positions of the sound source are determined from the plurality of candidate positions of the sound source based on a distance between a third micro microphone and the sound source. Specifically, both of (overlapped) projection points formed by projecting the first micro microphone and the second micro microphone into a plane of the plurality of candidate positions are a center point of the circle. A projection point formed by projecting the third micro microphone into the plane is a third projection point. A diameter through the center point and the third projection point divides the circle into two axisymmetric (mirrored) parts. Generally, there are two points in the circle that are symmetric with respect to the diameter, i.e. the two mirrored candidate positions of the sound source. Distances (which can be called as in-plane distances) from the two mirrored candidate positions to the third projection point are equal to each other. In combination with a distance (which can be called as an axial distance) from the third micro microphone to the plane, distances from the third micro microphone to the two mirrored candidate positions of the sound source are computed based on the Pythagorean theorem, and are equal.

A real position of the sound source is determined from the two mirrored candidate positions of the sound source based on a distance between a fourth micro microphone and the sound source.

It is understood that, it needs only four (e.g., the first to the fourth) arbitrary or randomly-selected micro microphones to determine the real position of the sound source based on distances between the four micro microphones and the sound source, without visiting all of the micro microphones in the micro microphone array.

Further, four micro microphones whose intervals are larger than a preset interval threshold can be selected from the micro microphone array.

The larger the interval between micro microphones is, the larger the difference between intensities of audio signals output by the different micro microphones for a same sound source is, the larger the difference between the determined distances between the different micro microphones and the same sound source is. As such, it is more benefit to reduce an impact of an error on determining the real position of the sound source. For example, four micro microphones which are located at the forefront, the backmost, the leftmost and the rightmost respectively can be selected from the micro microphone array to determine the real position of the sound source.

Figure 5A:
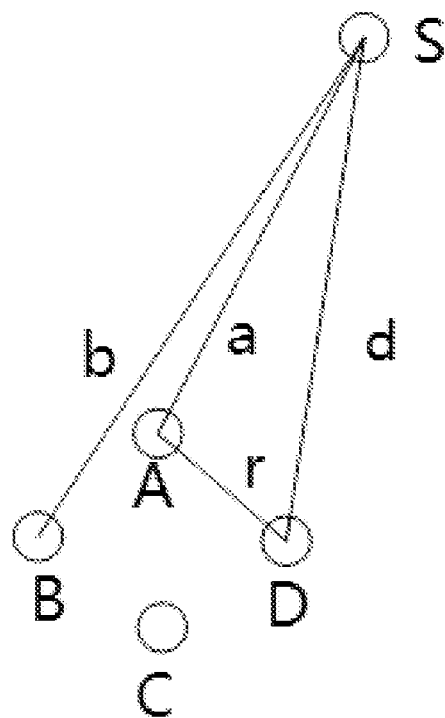
FIGS. 5*a* and 5*b* are a schematic diagram of an example of a principle and method of sound source localization in an interaction method provided by an embodiment of the present disclosure.

For example, as shown in FIG. 5a, four small circles of A, B, C and D represent four micro microphones in a micro microphone array respectively. A above small circle S represent a real position of a sound source. a, d, r represent a distance between micro microphone A and the sound source, a distance between micro microphone D and the sound source, and a distance between micro microphone A and micro microphone D, respectively.

Figure 5B:
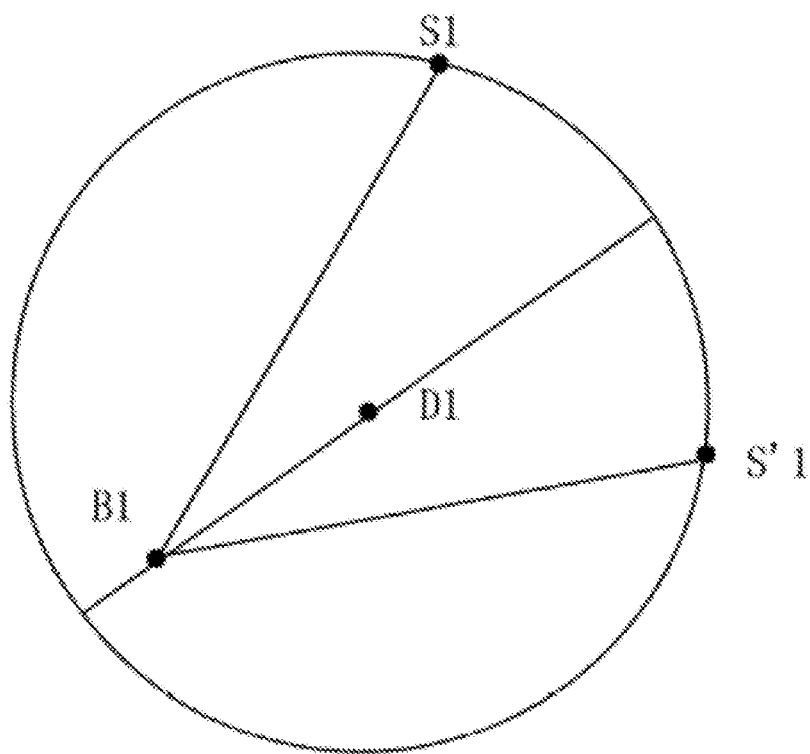

FIG. 5b is a schematic diagram of an example of a plane of a plurality of candidate positions of the sound source in the sound source localization process. The view angle (or direction) of FIG. 5b is based on FIG. 5a, and is a view angle (or direction) along a direction from point D to point A.

As shown in FIG. 5b, a circle located in a plane perpendicular to axis AD is obtained by rotating around axis AD, and A and D are projected into the circle. D1 is a projection point of D in the plane. Every point in the circle is a candidate position of the sound source. That is to say, every candidate position of the sound source meets that distances from it to the micro microphones A and D are a and d respectively.

A third micro microphone B is introduced. A distance between B and the sound source is divided into an axial distance from point B to a plane of a circle formed by a plurality of candidate positions of the sound source (i.e. a distance from B to its projection point B1) and an in-plane distance between the projection point B1 of B and the candidate position of the sound source. A diameter through B1 and D1 equally divides the circle into two symmetrical half. Two points having an equal in-plane distance to the projection point B1 of B that conforms to a distance between B and the sound source, are determined from the circle as two mirrored candidate positions of the sound source. S1 and S'1 in FIG. 5b are took as the two candidate positions of the sound source respectively. The so-called in-plane distance conforming to the distance between B and the sound source comprises, if the axial distance and the in-plane distance are the lengths of two right-angle sides of a right triangle respectively, meeting that the length of the hypotenuse of the right triangle is equal to the distance between B and the sound source. As such, distances between B and the two mirrored candidate positions of the sound source are equal, and equal to the distance between B and the sound source.

A fourth micro microphone C is introduced. In the two mirrored candidate positions of the sound source, there is necessarily only one position which make a distance between itself and C to be equal to a predetermined distance between C and the voice source. This position is the real position of the sound source. Therefore, the real position of the sound source can be determined from the two mirrored candidate positions of the sound source based on the distance between C and the voice source.

Exemplarily, another principle and method of determining the position of the sound source based on the distance between the sound source and each of the micro microphones comprises the following steps.

Firstly, a position of a fixed electrode at the bottom of each micro microphone is regarded as a reference point. At least four reference points are selected which meet a condition that arbitrary three of the four reference points are not in a same straight line.

Secondly, a sound signal from a sound source is received by a micro microphone. An intensity of the sound signal has a relationship with a distance between the sound source and the micro microphone. Therefore, there is a need to detect an intensity feature of an audio received by each micro microphone from the sound source so as to obtain a distance parameter between each micro microphone and the sound source.

Thirdly, three reference points are arbitrarily selected from the selected four reference points to infer a first sound source position and a second sound source position based on the trigonometric theorem. The first sound source position is the real position of the sound source, and the second sound source position is a mirrored virtual position of the real sound source.

Then, a fourth reference point is introduced. In combination with a distance between the sound source and a micro microphone that the fourth reference point belongs to, the second sound source position inconsistent with the objective law is excluded based on the inverse relationship between the audio intensity and the transmission distance, thus determining uniquely the real position of the sound source.

There is another solution. Firstly, two reference points are selected. Then, a third reference point is randomly introduced, so as to determine whether the selected three reference points are in a same straight line. If the three points are in a same straight line, the third reference point is regarded as an ineffective point, and a new third reference point is reintroduced and determined again, until the three points are not in a same straight line. A first sound source position representing the real position of the sound source and a second sound source position representing a mirrored virtual position of the sound source are inferred based on the trigonometric theorem. A fourth reference point is randomly introduced. The second sound source position inconsistent with the objective law is excluded based on the inverse relationship between the audio intensity and the transmission distance, thus determining uniquely the real position of the sound source.

Selection of four reference points also has another implementation. That is, a threshold is predetermined as an entrance condition for introducing reference points; then, two reference points are randomly selected to determine whether a distance between the selected two reference points is larger than or equal to the predetermined threshold; if the distance between the selected two reference points is larger than or equal to the predetermined threshold, the selected two reference points are regarded as effective points and retained; and if the distance between the selected two reference points is less than the predetermined threshold, the two reference points are regarded as ineffective points and discarded, and reference points are reselected until the selected two reference points meets the entrance condition. Setting of the threshold considers the quantity of electroencephalogram electrodes comprised by the electroencephalogram electrode array in one aspect, and arrangement of the electroencephalogram electrode array in another aspect (e.g. in an example, a distance between two reference points of electroencephalogram electrodes is larger than a straight-line distance between two adjacent electroencephalogram electrodes). Then a third reference point is randomly introduced to determine whether the selected third reference points is in the same straight line as the selected two reference points. If the three points are in a same straight line, the third reference point is regarded as an ineffective point, and a new third reference point is reintroduced and determined again, until the three points are not in a same straight line.

A first sound source position representing the real position of the sound source and a second sound source position representing a mirrored virtual position of the sound source are inferred based on the trigonometric theorem. A fourth reference point is randomly introduced. The second sound source position inconsistent with the objective law is excluded based on the inverse relationship between the audio intensity and the transmission distance, thus determining uniquely the real position of the sound source.

In the step of S402, the determining the electroencephalogram electrode of the electroencephalogram electrode array corresponding to the position of the sound source further comprises, matching the determined position of the sound source with orientations of electroencephalogram electrodes arranged at different positions and selecting one or more electroencephalogram electrodes whose orientations are best matched with (closest to) the position of the sound source, as electroencephalogram electrodes corresponding to the position of the sound source. Exemplarily, the one or more electroencephalogram electrodes whose orientations are best matched with (closest to) the position of the sound source are listed into a candidate group. One or more electroencephalogram electrodes are selected from the candidate group in combination with factors such as a distance of the sound source, brain use preference of the user, arrangement density of electroencephalogram electrodes, and are regarded as electroencephalogram electrodes corresponding to the position of the sound source.

Exemplarily, using the determined different distances from the position of the sound source to electroencephalogram electrodes arranged at different positions, one or more electroencephalogram electrodes closer to the position of the sound source are selected.

In the step of S403, the invoking the electroencephalogram electrode corresponding to the position of the sound source to output a touch signal to make a user perceiving further comprises, controlling the electroencephalogram electrode of the electroencephalogram electrode array corresponding to the position of the sound source to send a touch signal comprising current and/or vibrating. The user is prompted to perceive the position of the sound source by current excitation and/or vibrating excitation.

Exemplarily, the current excitation refers to that the electroencephalogram electrode emits a current within an intensity range into contacted outer skin of the head of a user, so as to prompt the user to perceive the position of the sound source. The vibrating excitation refers to that the electroencephalogram electrode generates mechanical vibrating within an intensity range on contacted outer skin of the head of the user, so as to prompt the user to perceive the position of the sound source.

It is understood that, the determining an electroencephalogram electrode of an electroencephalogram electrode array corresponding to the position of the sound source and outputting a touch signal are equivalent to that, the sound is converted into a touch signal perceivable by the touch of the user, and a position of the electroencephalogram electrode outputting the touch signal represents the position of the sound source. Even if a user has hearing disability, by means of touch, he can perceive the touch signal output by the corresponding electroencephalogram electrode and a position thereof, thus realizing there is another user at the position who wants to communicate with him. This can highly improve the probability of the user communicating with other users, thus benefiting to improve quality of live, work and learning of the user.

Exemplarily, after determining the position of the sound source in the step of S401, the display apparatus can also be invoked to accordingly display the determined position of the sound source. Exemplarily, the display apparatus is invoked to display the position of the sound source in its display interface to prompt the user. For example, based on the position of the sound source, a flickering cursor, or an arrow representing a direction, etc. is displayed at a position in the corresponding quadrant or direction of the display apparatus, wherein a distance between the position and the origin representing the user is in a preset proportion to intensity of the audio signal of the sound source.

Some users with hearing disability have no vision disability. These users can not only receive touch signals in form of current and/or vibration which are emitted by the electroencephalogram electrodes, but also obtain directional information based on vision. Therefore, configuration of the display apparatus just meets requirements of these users.

Although, according to the interaction method provided by the embodiments of the present disclosure, many users with hearing disability have successfully implemented perceiving, by touch, position information of other users who want to communicate with them, a requirement that the users with hearing disability want to respond to the other users having a communication will is generated subsequently. The other user herein refers to a user regarded as a sound source or a user at the position of the sound source in the present disclosure.

Figure 4B:
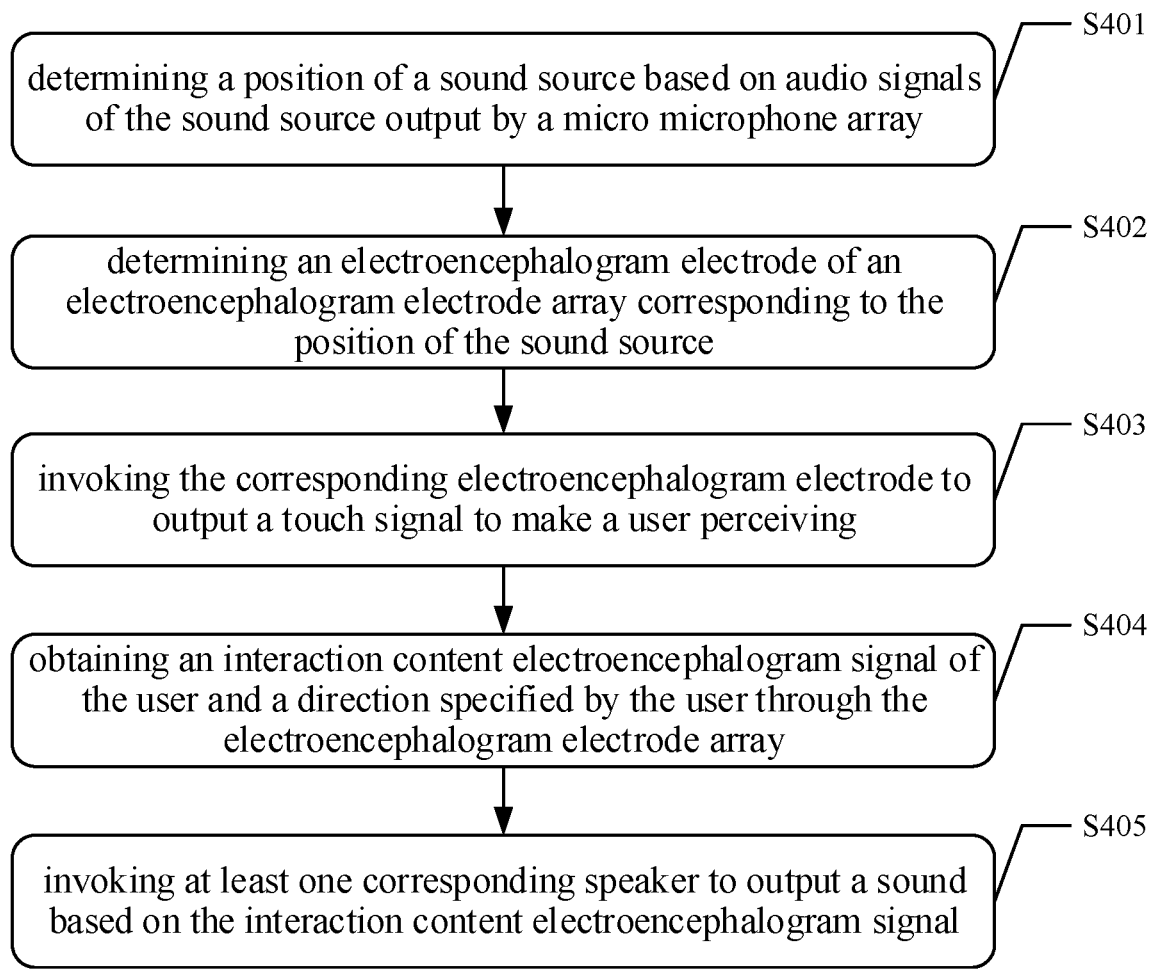
FIG. 4*b* is a schematic flow chart of another interaction method provided by an embodiment of the present disclosure.

In order to meet the urgent requirement that the user with hearing disability responds to the communication toward the position of the sound source, and to further support a requirement of the user initiating actively an interaction, on the basis of the interaction method, there is also provided another interaction method in the present disclosure. FIG. 4b shows a schematic flow chart of the other interaction method which comprises the steps of S401-S403 and the following steps.

In the step of S404, an interaction content electroencephalogram signal of the user and a direction specified by the user is obtained through the electroencephalogram electrode array.

When a starting active interaction electroencephalogram signal of the user is received through the electroencephalogram electrode array, the display apparatus is invoked to highlight a plurality of direction ranges in a first direction selection interface in turn. When a determination electroencephalogram signal of the user is received through the electroencephalogram electrode array, a currently highlighted direction range is determined as a direction range specified by the user.

The starting active interaction electroencephalogram signal herein refers to a prompted electroencephalogram signal emitted by the user to the electroencephalogram electrode array for showing a request that there is a requirement to actively communication with other users.

The interaction content electroencephalogram signal carries content that the user wants to express and communicate with other users. In an embodiment of the present disclosure, generally, after the received starting active interaction electroencephalogram signal generated by the user (i.e. the generating is regarded as active sending of the user) is responded, an interaction content electroencephalogram signal continually sent and generated by the user can be further obtained.

Exemplarily, the starting active interaction electroencephalogram signals of the user can be trained in advance to obtain a sample starting active interaction electroencephalogram signal of the user. For example, the user is enabled to repeatedly image a scene status such as an action or a look of beginning communication with other users, and at the same time, electroencephalogram signals of the user in imagination are collected by specialized apparatuses. The connected electroencephalogram signals are processed to obtain a sample starting active interaction electroencephalogram signal, thus generating a training model of the sample starting active interaction electroencephalogram signal.

Later, when an electroencephalogram signal of the user is received, the received electroencephalogram signal of the user is compared with a sample starting active interaction electroencephalogram signal of the training model. If the compared result is that they are consistent with each other, the received electroencephalogram signal of the user is determined as a starting active interaction electroencephalogram signal. If the compared result is that they are inconsistent with each other, the received electroencephalogram signal of the user is determined as not a starting active interaction electroencephalogram signal. Thus, the electroencephalogram signal and subsequent processes can be given up for example to save processing resources.

In the same way, various sample interaction content electroencephalogram signals can be trained, thus determining various interaction content electroencephalogram signals; subsequent sample determination electroencephalogram signals can be trained, thus determining determination electroencephalogram signals; and subsequent sample denying electroencephalogram signals can be trained, thus determining denying electroencephalogram signals, which are not described repeatedly.

In the step of S405, at least one corresponding speaker is invoked to output a sound based on the interaction content electroencephalogram signal.

After determining the direction range specified by the user, the display apparatus is invoked to display an interaction information inputting interface. When the interaction content electroencephalogram signal fed back by the user with respect to guiding of the interaction information inputting interface is received through the electroencephalogram electrode array, at least one speaker corresponding to the direction range specified by the user is invoked to output a sound based on the interaction content electroencephalogram signal.

Further, in the step of S404, after the direction range specified by the user is determined, the display apparatus is invoked to highlight a plurality of angular directions in a second direction selection interface in turn. When a determination electroencephalogram signal of the user is received through the electroencephalogram electrode array, a currently highlighted angular direction is determined as the angular direction specified by the user. Further, in the step of S405, after the angular direction specified by the user is determined, the display apparatus is invoked to display the interaction information inputting interface. When the interaction content electroencephalogram signal fed back by the user with respect to guiding of the interaction information inputting interface is received through the electroencephalogram electrode array, at least one speaker corresponding to the angular direction specified by the user is invoked to output a sound based on the interaction content electroencephalogram signal.

Further, after the electroencephalogram electrode array receives the electroencephalogram signal of the user, it is firstly determined by comparison whether the received electroencephalogram signal is the determination electroencephalogram signal representing "the direction range specified by the user". This process comprises the following steps. A lot of electroencephalogram signals are collected as samples in advance, and trained to obtain an electroencephalogram signal corresponding to position information of the sound source, which is regarded as a standard reference sample and stored into a sample library in the memory. When the user actively emits a determination electroencephalogram signal comprising position information of the sound source, the determination electroencephalogram signal is compared one-to-one with the samples in the sample library, and analyzed to select a sample of the sample library that matched with the determination electroencephalogram signal.

The determination electroencephalogram signal refers to an electroencephalogram signal emitted by the user for making an affirmative judgement. The denying electroencephalogram signal refers to an electroencephalogram signal emitted by the user for making a negative judgement.

Figure 6:
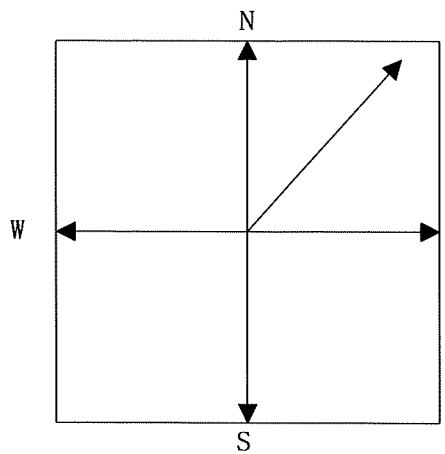
FIG. 6 is a schematic diagram of an example of a first direction selection interface of an interaction method provided by an embodiment of the present disclosure.
Figure 7:
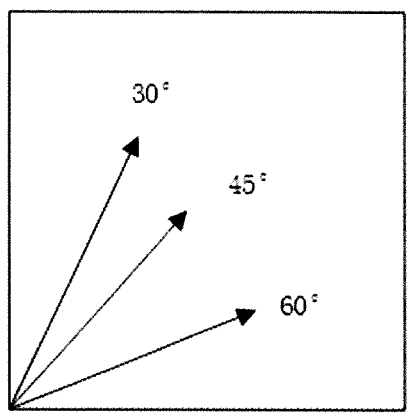
FIG. 7 is a schematic diagram of an example of a second direction selection interface of an interaction method provided by an embodiment of the present disclosure.

FIG. 6 shows an example of a first direction selection interface. As shown in combination with FIG. 6, positions are divided into four directions of east, west, south and north, and then a cursor flickers in the four quadrants in turn (other prompted identifications can also be used to highlight in the first direction selection interface in turn). The electroencephalogram is tested, and a "strong" feedback shows it is in this quadrant. The "strong" herein refers to that the determination electroencephalogram signal of the user received by the electroencephalogram electrode array meets a corresponding condition of the trained electroencephalogram signal corresponding to position information of the sound source that is used as the standard reference sample. FIG. 7 is a schematic diagram of an example of a second direction selection interface. It can be known in combination with FIG. 7, after the user selects a large direction range, it can be prompted by the second direction selection interface to further determine an angular direction selected by the user, such as 30°, 45°, and 60°. The user responds to the prompted information of the second direction selection interface. For example, a flickered cursor appears in turn within the 30°, 45°, and 60° region ranges in the second direction selection interface. When the determination electroencephalogram signal output by the user is received, the user is regarded as selecting "Yes", and the corresponding 30°, 45°, or 60° flickered at this time is took as the angular direction specified by the user.

It is understood that, when the user actively makes a sound to (interact with or express to) other users, the system comprises three following electroencephalogram signals cooperated with each other: a starting active interaction electroencephalogram signal for triggering an active interaction, a determination electroencephalogram signal for obtaining a (vocalization) direction specified by a user, and an interaction content electroencephalogram signal for obtaining a content to be conveyed by a user.

The starting active interaction electroencephalogram signal refers to that a user emits an electroencephalogram signal having a subjective will of an active interaction to an electroencephalogram electrode array of the interaction system. The determination electroencephalogram signal refers to for example that, when the display apparatus in the interaction system highlights a plurality of direction ranges in a direction selection interface, a user emits an electroencephalogram signal representing compleltive affirmation and having a deterministic response to the electroencephalogram electrode array of the interaction system.

The interaction content electroencephalogram signal is an electroencephalogram signal, such as "Hello", "Nice to meet you", which represents specific communication information and is fed back by the user to the electroencephalogram electrode array in a prompt interface. The prompt interface prompts the user to input content to be conveyed after the interaction system provided by the present embodiment receives the determination electroencephalogram signal of the user through the electroencephalogram electrode array.

The interaction method comprising the display apparatus and the speaker array provided by the above embodiments embodies a cooperative process of the display apparatus and the speaker array that identifies a chance of active initiating an interaction of the user with hearing disability, identifies a direction specified by the user with hearing disability, obtains content to be conveyed by the user with hearing disability and sends it directionally. Generally, users with hearing disability often have different degrees of defects in verbalization. Some of them cannot even make a sound normally, and cannot speak. The interaction methods provided by the above embodiment make the users with hearing disability or speech disability to communicate with other users more conveniently, by identifying a direction specified by the user and specifically and vividly guiding the user to select a direction and input content to be conveyed with various interfaces.

In the specific implementation, the interaction method is carried out by executing at least one program through one or more processors in the signal processing circuit. Exemplarily, the at least one program is used for determining a position of a sound source based on audio signals of the sound source output by a micro microphone array; determining an electroencephalogram electrode of an electroencephalogram electrode array corresponding to the position of the sound source; and invoking the electroencephalogram electrode corresponding to the position of the sound source to output a touch signal to make a user perceiving.

The at least one program is used for determining a distance between the sound source and each of a plurality of micro microphones based on intensities of audio signals of the sound source output by the micro microphones; and determining the position of the sound source based on the distance-between the sound source and each of the micro microphones.

When the at least one program receives a starting active interaction electroencephalogram signal of the user through the electroencephalogram electrode array, the display apparatus is invoked to highlight a plurality of direction ranges in a first direction selection interface in turn. For example, the display apparatus shows flicked cursors in the first direction selection interface in turn to prompt the user to select a target direction. When a determination electroencephalogram signal of the user is received through the electroencephalogram electrode array, a currently highlighted direction range is determined as a direction range specified by the user.

After determining the direction range specified by the user, the display apparatus is invoked to display an interaction information inputting interface. When the interaction content electroencephalogram signal fed back by the user with respect to guiding of the interaction information inputting interface is received through the electroencephalogram electrode array, at least one speaker corresponding to the direction range specified by the user is invoked to output a sound based on the interaction content electroencephalogram signal.

The at least one program is further configured for, after determining the direction range specified by the user, invoking the display apparatus to highlight a plurality of angular directions in a second direction selection interface in turn. Different interfaces are used to differentiate which of electroencephalogram signals are signals used by the user to select directions, and which of electroencephalogram signals are signals carrying content that the user would convey to the sound source (e.g. other users).

When a determination electroencephalogram signal of the user is received through the electroencephalogram electrode array, a currently highlighted angular direction is determined as an angular direction specified by the user. After determining the angular direction specified by the user, the display apparatus is invoked to display the interaction information inputting interface. When the interaction content electroencephalogram signal fed back by the user with respect to guiding of the interaction information inputting interface is received through the electroencephalogram electrode array, at least one speaker corresponding to the angular direction specified by the user is invoked to output a sound based on the interaction content electroencephalogram signal.

Figure 8:
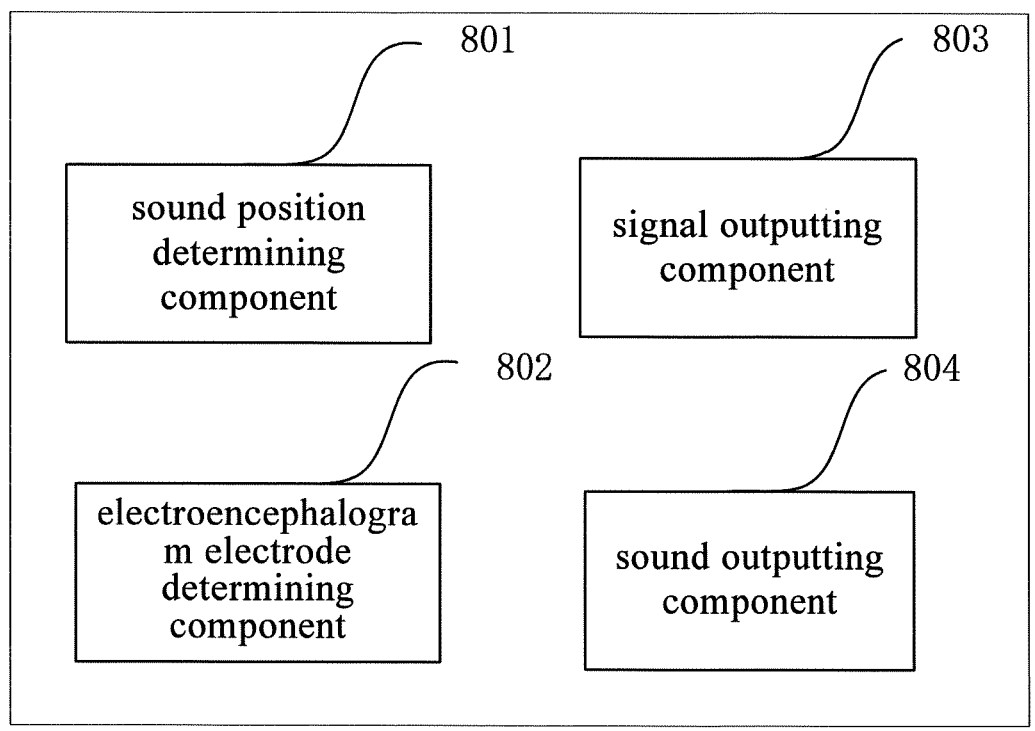
FIG. 8 is a schematic frame diagram of an internal structure of an interaction device provided by an embodiment of the present disclosure.

The present disclosure further provides an embodiment of an interaction device. A schematic frame diagram of an internal structure of the device is shown in FIG. 8. The device comprises a sound source position determining component 801, an electroencephalogram electrode determining component 802 and a signal outputting component 803.

The sound source position determining component 801 is used for determining a position of a sound source based on audio signals of the sound source output by a micro microphone array.

The electroencephalogram electrode determining component 802 is used for determining an electroencephalogram electrode of an electroencephalogram electrode array corresponding to the position of the sound source.

The signal outputting component 803 is used for invoking the electroencephalogram electrode corresponding to the position of the sound source to output a touch signal to make a user perceiving.

Exemplarily, the sound source position determining component 801 is specifically used for, determining a distance between the sound source and each of a plurality of micro microphones based on intensities of audio signals of the sound source output by the micro microphones; and determining the position of the sound source based on the distance between the sound source and each of the micro microphones.

Exemplarily, the signal outputting component 803 is further used for invoking a display apparatus to correspondingly display the direction of the sound source determined by the sound source position determining component.

In order to further enhance an interaction ability of the interaction device so that users using this device can actively send interaction information toward the specified direction, as shown in FIG. 8, the interaction device further comprises a sound outputting component 804.

The sound outputting component 804 is used for obtaining an interaction content electroencephalogram signal of the user and a direction specified by the user through the electroencephalogram electrode array; and invoking at least one corresponding speaker of a speaker array to output a sound based on the interaction content electroencephalogram signal.

Exemplarily, the sound outputting component 804 is specifically used for, invoking the display apparatus to highlight a plurality of direction ranges in a first direction selection interface in turn when receiving a starting active interaction electroencephalogram signal of the user through the electroencephalogram electrode array; determining a currently highlighted direction range as a direction range specified by the user, when receiving a determination electroencephalogram signal of the user through the electroencephalogram electrode array; invoking the display apparatus to display an interaction information inputting interface after determining the direction range specified by the user; and invoking at least one speaker corresponding to the direction range specified by the user to output a sound based on the interaction content electroencephalogram signal, when receiving the interaction content electroencephalogram signal fed back by the user with respect to guiding of the interaction information inputting interface through the electroencephalogram electrode array.

Exemplarily, the sound outputting component 804 is further used for, after determining the direction range specified by the user, invoking the display apparatus to highlight a plurality of angular directions in a second direction selection interface in turn; when receiving a determination electroencephalogram signal of the user through the electroencephalogram electrode array, determining a currently highlighted angular direction as the angular direction specified by the user; after determining the angular direction specified by the user, invoking the display apparatus to display the interaction information inputting interface; and when receiving the interaction content electroencephalogram signal fed back by the user with respect to guiding of the interaction information inputting interface through the electroencephalogram electrode array, invoking at least one speaker corresponding to the angular direction specified by the user to output a sound based on the interaction content electroencephalogram signal.

It would be understood by the skilled person in the art that, unless specifically stated, the singular form "a", "an", "said" and "the" used herein can also include a plural form. It would be further understood that, the word "comprising" used in the description of the present disclosure is directed to presence of features, integer, steps, operations, elements, and/or components, but does not exclude presence or addition of at least one other feature, integer, step, operations, element, component and/or group thereof. It would be understood that, when an element is referred to "connect" or "couple" to another element, it can directly connect or couple to the other element, or there can be an intermediate element. Furthermore, "connection" or "coupling" used herein can comprise wireless connection or wireless coupling. The word "and/or" used herein comprises all or any and all combination of one or more associated listing items.

It would be understood by the skilled person in the art that, unless specifically stated, all terms used herein (comprising technical terms and scientific terms) have a same sense as common understanding of the ordinary skilled in the art of the present disclosure. It would be further understood that, for example, those terms defined in the general-purpose dictionary should be understood as having a sense consistent with that in the context of the prior art, and cannot be construed with an idealized or overformal meaning, unless specifically defined like here.

It would be understood by the skilled person in the art that, each block in these structure diagrams and/or block diagrams and/or flow charts and combination thereof can be carried out with computer program instructions. It would be understood by the skilled person in the art that, these computer program instructions can be provided to a processor of a general-purpose computer, a professional computer, or other programmable data processing method to carry out, thus executing solutions specified in one or more blocks of structure diagrams and/or block diagrams and/or flow charts disclosed by the present disclosure through the processor of the computer, or the other programmable data processing method.

It would be understood by the skilled person in the art that, steps, measures and solutions in various operations, methods and flows discussed in the present disclosure can be alternated, altered, combined or deleted. Further, other steps, measures and solutions having various operations, methods and flows discussed in the present disclosure can also be alternated, altered, rearranged, disassembled, combined or deleted. Further, steps, measures and solutions of the prior art having various operations, methods and flows disclosed by the present disclosure can also be alternated, altered, rearranged, disassembled, combined or deleted.

The above are only parts of implementations of the present disclosure. It is noted that, several improvements and modifications can be made by the ordinary skilled person in the art without departing from the principle of the present disclosure, and can be regarded as the scope of the present disclosure.

The invention claimed is:

1. An interaction system comprising,
    an electroencephalogram electrode array comprising at least one electroencephalogram electrode;
    a micro microphone array comprising a plurality of micro microphones;
    a signal processing circuit electrically connected with the electroencephalogram electrode array and the micro microphone array respectively, the signal processing circuit comprising a processor and a plurality of converting circuits, and the plurality of micro microphones electrically connected one-to-one with the plurality of converting circuits respectively, and the processor electrically connected with electroencephalogram electrodes in the electroencephalogram electrode array;
    a memory configured to store data and electrically connected with the signal processing circuit; and
    at least one program stored in the memory and configured to carry out, when executed by the signal processing circuit,
    determining a distance between a sound source and each of the micro microphones based on intensities of audio signals of the sound source output by the plurality of micro microphones,
    determining a position of the sound source based on the distance between the sound source and each of the micro microphones,
    determining an electroencephalogram electrode of the electroencephalogram electrode array corresponding to the position of the sound source, and
    invoking the electroencephalogram electrode corresponding to the position of the sound source to output a touch signal.

2. The system according to claim 1, wherein the signal processing circuit is located above the electroencephalogram electrode array, and the micro microphone array is located above the signal processing circuit.

3. The system according to claim 1, wherein the system further comprises a display apparatus, and wherein the at least one program is further configured to invoke the display apparatus to perform a corresponding display after determining the position of the sound source.

4. The system according to claim 3, wherein the system further comprises a speaker array, speakers in the speaker array are electrically connected with the processor, and the at least one program is further configured to obtain an interaction content electroencephalogram signal of the user and a direction specified by the user through the electroencephalogram electrode array, and invoke at least one speaker corresponding to the direction to output a sound based on the interaction content electroencephalogram signal.

5. The system according to claim 4, wherein the at least one program is configured to,
invoke the display apparatus to highlight a plurality of direction ranges in a first direction selection interface in turn, when receiving a starting active interaction electroencephalogram signal of the user through the electroencephalogram electrode array;
determine a currently highlighted direction range as a direction range specified by the user, when receiving a determination electroencephalogram signal of the user through the electroencephalogram electrode array;
invoke the display apparatus to display an interaction information inputting interface; and
invoke at least one speaker corresponding to the direction range specified by the user to output a sound based on the interaction content electroencephalogram signal, when receiving the interaction content electroencephalogram signal fed back by the user with respect to guiding of the interaction information inputting interface, through the electroencephalogram electrode array.

6. The system according to claim 4, wherein the at least one program is further configured to,
invoke the display apparatus to highlight a plurality of direction ranges in a first direction selection interface in turn, when receiving a starting active interaction electroencephalogram signal of the user through the electroencephalogram electrode array;
determine a currently highlighted direction range as a direction range specified by the user, when receiving a determination electroencephalogram signal of the user through the electroencephalogram electrode array;
invoke the display apparatus to highlight a plurality of angular directions in a second direction selection interface in turn, after determining the direction range specified by the user;
determine a currently highlighted angular direction as an angular direction specified by the user, when receiving a determination electroencephalogram signal of the user through the electroencephalogram electrode array;
invoke the display apparatus to display the interaction information inputting interface; and
invoke at least one speaker corresponding to the angular direction specified by the user to output a sound based on the interaction content electroencephalogram signal, when receiving the interaction content electroencephalogram signal fed back by the user with respect to guiding of the interaction information inputting interface, through the electroencephalogram electrode array.

7. An interaction method comprising,
determining a distance between a sound source and each of a plurality of micro microphones of a micro microphone array based on intensities of audio signals of the sound source output by the micro microphones;
determining a position of the sound source based on the distance between the sound source and each of the micro microphones;
determining an electroencephalogram electrode of an electroencephalogram electrode array corresponding to the position of the sound source; and
invoking the electroencephalogram electrode corresponding to the position of the sound source to output a touch signal.

8. The method according to claim 7, further comprising, invoking a display apparatus to correspondingly display the determined position of the sound source.

9. The method according to claim 8, further comprising,
obtaining an interaction content electroencephalogram signal of the user and a direction specified by the user through the electroencephalogram electrode array; and
invoking at least one speaker of a speaker array corresponding to the direction to output a sound based on the interaction content electroencephalogram signal.

10. The method according to claim 9, further comprising,
invoking the display apparatus to highlight a plurality of direction ranges in a first direction selection interface in turn, when receiving a starting active interaction electroencephalogram signal of the user through the electroencephalogram electrode array;
determining a currently highlighted direction range as a direction range specified by the user, when receiving a determination electroencephalogram signal of the user through the electroencephalogram electrode array;
invoking the display apparatus to display an interaction information inputting interface; and
invoking at least one speaker corresponding to the direction range specified by the user to output a sound based on the interaction content electroencephalogram signal, when receiving the interaction content electroencephalogram signal fed back by the user with respect to guiding of the interaction information inputting interface, through the electroencephalogram electrode array.

11. The method according to claim 9, further comprising,
invoking the display apparatus to highlight a plurality of direction ranges in a first direction selection interface in turn, when receiving a starting active interaction electroencephalogram signal of the user through the electroencephalogram electrode array;
determining a currently highlighted direction range as a direction range specified by the user, when receiving a determination electroencephalogram signal of the user through the electroencephalogram electrode array;
invoking the display apparatus to highlight a plurality of angular directions in a second direction selection interface in turn;
determining a currently highlighted angular direction as an angular direction specified by the user, when receiving a determination electroencephalogram signal of the user through the electroencephalogram electrode array;
invoking the display apparatus to display the interaction information inputting interface; and
invoking at least one speaker corresponding to the angular direction specified by the user to output a sound based on the interaction content electroencephalogram signal, when receiving the interaction content electroencephalogram signal fed back by the user with respect to guiding of the interaction information inputting interface, through the electroencephalogram electrode array.

12. An interaction device comprising,
a sound source position determining component for determining a distance between a sound source and each of a plurality of micro microphones of a micro microphone array based on intensities of audio signals of the sound source output by the micro microphones, and determining a position of the sound source based on the distance between the sound source and each of the micro microphones;

an electroencephalogram electrode determining component for determining an electroencephalogram electrode of an electroencephalogram electrode array corresponding to the position of the sound source; and a signal outputting component for invoking the electroencephalogram electrode corresponding to the position of the sound source to output a touch signal.

13. The interaction device according to claim 12, wherein the signal outputting component is further used for invoking a display apparatus to correspondingly display the position of the sound source determined by the sound source position determining component.

14. The interaction device according to claim 13, further comprising, a sound outputting component for obtaining an interaction content electroencephalogram signal of the user and a direction specified by the user through the electroencephalogram electrode array; and invoking at least one speaker of a speaker array corresponding to the direction to output a sound based on the interaction content electroencephalogram signal.

15. The interaction device according to claim 14, wherein the sound outputting component is specifically used for, invoking the display apparatus to highlight a plurality of direction ranges in a first direction selection interface in turn, when receiving a starting active interaction electroencephalogram signal of the user through the electroencephalogram electrode array;

determining a currently highlighted direction range as a direction range specified by the user, when receiving a determination electroencephalogram signal of the user through the electroencephalogram electrode array;

invoking the display apparatus to display an interaction information inputting interface; and invoking at least one speaker corresponding to the direction range specified by the user to output a sound based on the interaction content electroencephalogram signal, when receiving the interaction content electroencephalogram signal fed back by the user with respect to guiding of the interaction information inputting interface, through the electroencephalogram electrode array.

16. The interaction device according to claim 14, wherein the sound outputting component is specifically used for, invoking the display apparatus to highlight a plurality of direction ranges in a first direction selection interface in turn, when receiving a starting active interaction electroencephalogram signal of the user through the electroencephalogram electrode array;

determining a currently highlighted direction range as a direction range specified by the user, when receiving a determination electroencephalogram signal of the user through the electroencephalogram electrode array;

invoking the display apparatus to highlight a plurality of angular directions in a second direction selection interface in turn;

determining a currently highlighted angular direction as a angular direction specified by the user, when receiving a determination electroencephalogram signal of the user through the electroencephalogram electrode array;

invoking the display apparatus to display the interaction information inputting interface; and invoking at least one speaker corresponding to the angular direction specified by the user to output a sound based on the interaction content electroencephalogram signal, when receiving the interaction content electroencephalogram signal fed back by the user with respect guiding of the interaction information inputting interface, through the electroencephalogram electrode array.

\* \* \* \* \*